United States Patent
Ling et al.

(10) Patent No.: US 12,035,082 B2
(45) Date of Patent: *Jul. 9, 2024

(54) PROCESS MARGIN RELAXATION

(71) Applicant: Cisco Technology, Inc., San Jose, CA (US)

(72) Inventors: Tao Ling, Breinigsville, PA (US); Ravi S. Tummidi, Breinigsville, PA (US); Yi Ho Lee, Breinigsville, PA (US); Mark A. Webster, Bethlehem, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,160

(22) Filed: Nov. 16, 2022

(65) Prior Publication Data

US 2023/0076009 A1 Mar. 9, 2023

Related U.S. Application Data

(63) Continuation of application No. 17/305,287, filed on Jul. 2, 2021, now Pat. No. 11,523,192, which is a continuation of application No. 16/862,262, filed on Apr. 29, 2020, now Pat. No. 11,089,391.

(51) Int. Cl.
*H04Q 11/00* (2006.01)
*H04J 14/02* (2006.01)

(52) U.S. Cl.
CPC ...... *H04Q 11/0005* (2013.01); *H04J 14/0204* (2013.01); *H04J 14/0205* (2013.01); *H04J 14/0216* (2013.01); *H04Q 2011/0007* (2013.01)

(58) Field of Classification Search
CPC ....... H04Q 11/0005; H04Q 2011/0007; H04Q 2011/0015; H04Q 2011/0022; H04Q 2011/0016; H04J 14/0204; H04J 14/0205; H04J 14/0216; H04J 14/02; H04J 14/0212; H04J 14/0279; H04J 14/0213; H04J 14/06; H04J 14/0307; G02B 6/2773; G02B 2006/12164; G02B 6/125
See application file for complete search history.

(56) References Cited

U.S. PATENT DOCUMENTS

| | | | | |
|---|---|---|---|---|
| 4,942,294 A * | 7/1990 | Witte | ...... | G01D 5/268 250/226 |
| 5,475,771 A * | 12/1995 | Hosoi | ...... | G02B 6/126 385/11 |
| 6,512,865 B1 * | 1/2003 | Shen | ...... | H04B 10/85 385/24 |

(Continued)

*Primary Examiner* — Hibret A Woldekidan
(74) *Attorney, Agent, or Firm* — Patterson + Sheridan, LLP

(57) ABSTRACT

Process margin relaxation is provided in relation to a compensated-for process via a first optical device, fabricated to satisfy an operational specification when a compensated-for process is within a first tolerance range; a second optical device, fabricated to satisfy the operational specification when the compensated-for process is within second tolerance range, different than the first tolerance range; a first optical switch connected to an input and configured to output an optical signal received from the input to one of the first optical device and the second optical device; and a second optical switch configured to combine outputs from the first optical device and the second optical device.

14 Claims, 6 Drawing Sheets

(56) References Cited

U.S. PATENT DOCUMENTS

| | | | |
|---|---|---|---|
| 2012/0230690 A1* | 9/2012 | Doerr | G02B 6/2938 |
| | | | 385/11 |
| 2015/0222969 A1* | 8/2015 | Urata | H04Q 11/0005 |
| | | | 398/48 |
| 2017/0276969 A1* | 9/2017 | Goodwill | G02F 1/0147 |
| 2018/0070156 A1* | 3/2018 | Kawai | H04J 14/0209 |

* cited by examiner

US 12,035,082 B2

PROCESS MARGIN RELAXATION

CROSS-REFERENCE TO RELATED APPLICATIONS

This application is a continuation of co-pending U.S. patent application Ser. No. 17/305,287, filed Jul. 2, 2021, which is a continuation of U.S. patent application Ser. No. 16/862,262 filed Apr. 29, 2020, which issued on Aug. 10, 2021 as U.S. Pat. No. 11,089,391. The aforementioned related patent applications are herein incorporated by reference in their entireties.

TECHNICAL FIELD

Embodiments presented in this disclosure generally relate to component fabrication in optical or photonic devices. More specifically, embodiments disclosed herein relate to relaxing or expanding the fabrication process margins to handle variable or unpredictable manufacturing tolerances in various fabrication processes.

BACKGROUND

The fabrication of photonic devices and the components thereof on Photonic Integrated Circuits (PICs) are affected by various manufacturing techniques, and may be constrained by the tolerances in those techniques. These tolerances can vary from layer to layer in a fabricated device. For example, silicon photonic devices fabricated on Silicon On Insulator (SOI) wafers can include a device layer (fabricated on a Si or other semiconductor layer) with a variation in thickness of roughly X %, but can include other deposited or bonded layers (e.g., a SiN waveguide layer) with variations in thickness of roughly ±X nm. The differences in tolerances, and the sensitivity to variation that different layers have can lead to stacking tolerances that, although every individual layer is within manufacturing tolerances, the overall effectiveness of the fabricated device is out of tolerance; leading to low yields in the manufacturing process, devices that perform sub-optimally, and/or difficult-to-scale construction processes to reduce the tolerances.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
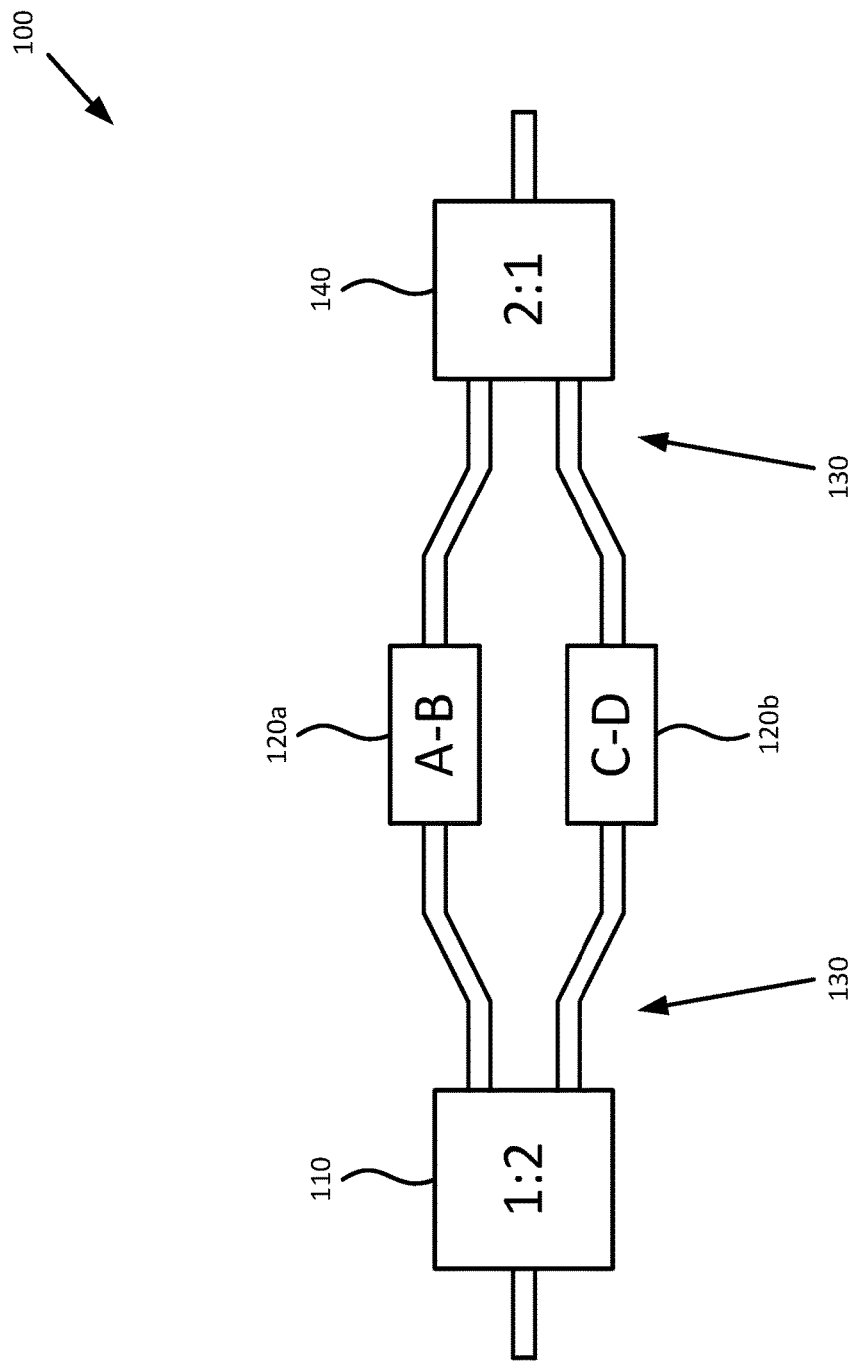
FIG. 1 illustrates a two-way architecture of a selective photonic element to improve the yield of photonic device fabrication, according to embodiments of the present disclosure.

One embodiment presented in this disclosure is a photonic element, comprising: a first optical device, fabricated to satisfy an operational specification when a compensated-for process is within a first tolerance range; a second optical device, fabricated to satisfy the operational specification when the compensated-for process is within second tolerance range, different than the first tolerance range; a first optical switch connected to an input and configured to output an optical signal received from the input to one of the first optical device and the second optical device; and a second optical switch configured to combine outputs from the first optical device and the second optical device.

One embodiment presented in this disclosure is a photonic element, comprising: an optical switch, including: a receiver arm; a first output arm; and a second output arm; a first optical combiner, including: a first primary input arm; a first secondary input arm; and a first transmitter arm; a second optical combiner, including: a second primary input arm; a second secondary input arm; and a second transmitter arm; a first demultiplexer connected to the first output arm, the first primary input arm, and the second primary input arm, wherein the first demultiplexer is configured to satisfy an operational specification when a compensated-for process is within a first tolerance range; and a second demultiplexer connected to the second output arm, the first secondary input arm, and the second secondary input arm, wherein the second demultiplexer is configured for to satisfy the operational specification when the compensated-for process is within a second tolerance range, different than the first tolerance range.

One embodiment presented in this disclosure is a method, comprising: fabricating an optical switch; fabricating, according to a first tolerance range of a compensated-for process, a first optical device in communication with a first splitter arm of the optical switch; fabricating, according to a second tolerance range of the compensated-for process that is different than the first tolerance range, a second optical device in communication with a second splitter arm of the optical switch; fabricating an optical combiner with a first combiner arm in communication with the first optical device and a second combiner arm in communication with the second optical device; performing the compensated-for process; in response to testing the first optical device and the second optical device, selecting one of the first optical device and the second optical device performing to an operational specification for a photonic device based on the compensated-for process; and controlling the optical switch to direct optical signals to and the optical combiner to receive optical signals from the selected one of the first optical device and the second optical device.

Example Embodiments

The present disclosure provides for relaxing or expanding the fabrication process margins to handle variable or unpredictable manufacturing tolerances in various fabrication processes by allowing for the selection between multiple optical devices pre-constructed to exhibit different tolerance ranges for a given fabrication process with a difficult-to-control-for fabrication tolerance. Various switching (including splitting and recombining) arrangements are provided for selecting one optical device of a plurality of optical devices that are configured to compensate for variances in a separate fabrication process to result in a photonic element that operates within its operational tolerances. Accordingly, two or more optical devices are provided in a photonic element with separate tolerance ranges, thus allowing a fabrication tolerance for the other process to extend across the two or more devices.

Stated differently, if a fabrication process has a fabrication range of X-Z, and the optical devices cannot be constructed to operate properly across the whole fabrication range of X-Z, several individual optical devices are provided with smaller tolerance ranges to extend across the range of X-Z (e.g., X-Y and Y-Z), and one optical device is selected for use depending on the output of the fabrication process. For example, consider a fabrication process for a semiconductor deposition process has a fabrication range of 40-60 nanometers (nm) in thickness, and the optical devices can be constructed to operate with thicknesses of the semiconductor in 10 nm increments. Accordingly, a first optical device may operate according to specification when the thickness is between 40-50 nm, but not operate according to specification when the thickness is between 50-60 nm, but a second optical device is provided to operate in this 50-60 nm tolerance range. An operator or fabricator can select which of these optical devices to use based on the thickness of the fabrication process to align the tolerances (e.g., use the first optical device when the semiconductor deposition is between 40-50 nm, but use the second optical device when the semiconductor deposition is between 50-60 nm).

Although examples are given herein primarily with respect to the tolerance ranges being provided to compensate for variances in thickness of another process (e.g., a thickness of a second wafer or a film bonded to a wafer in which the optical devices are fabricated, a thickness of deposition layer, a thickness resulting from a physical/chemical etch of a material), the tolerance ranges can relate to other properties in various embodiments. For example, a tolerance range can relate to ranges in dopant concentration, refractive index, component width (e.g., a size in a different orientation than "thickness"), resistivity, inductance, capacitance, reflectivity, etc.

FIG. 1 illustrates a two-way architecture 100 of a selective photonic element to improve the yield of photonic device fabrication, according to embodiments of the present disclosure. In the two-way architecture 100, the selective photonic element includes an optical switch 110 and an optical combiner 140, a first optical device 120a and a second optical device 120b (generally, optical device 120; collectively, optical devices 120). The optical switches 110 and combiners 140 are coupled to the optical devices 120 by 2×2 couplers 130 to define potential light pathways running from the optical switch 110, through one of the first optical device 120a and the second optical device 120b, and outputting from the optical combiner 140.

The fabricator uses various optical switches 110 and combiners 140 to control the input and output of optical signals through the selected (and not through the non-selected) optical devices 120. Depending on the arrangement and the components that the selective photonic element is connected to that are not illustrated in the Figures, the selective photonic element may be one-directional (i.e., allowing for signal direction in one designated direction) or bidirectional (i.e., allowing for signal transmission in either direction). For ease of explanation, the present disclosure describes operation of the various photonic devices herein for one-directional pathways moving from left-to-right when viewing the Figures. But the present disclosure also covers using right-to-left one-directional pathways (i.e., the opposite signaling direction from what is generally given in the examples) and bidirectional pathways (e.g., substituting an understanding of a splitter/demultiplexer to operate as a combiner/multiplexer when used in reverse).

The optical switches 110 and combiners 140 may operate according to various schemas, including physical switches that route signals by linking different input/output pairs, electro/magnetic switches that use electromagnetic effects to route light, and thermally controlled switches (e.g., Mach-Zehnder Interferometers) that phase shift paired optical signals to extinguish one optical signal and transmit another on output leads from the switch. For example, in a thermally controlled switch, a received signal is split into two complementary signals, each with half of the original amplitude, which can be phase shifted relative to one another so that when re-combined, the resulting output signal is equal to the original amplitude or reduced to zero. The phase shifters in the thermally controlled switch heat the transmission medium in the switch to control a level of phase shift on a given arm (e.g., between 0-7 radians) and thereby the amplitude of the signals output from the optical switches 110 and combiners 140.

When optical signals are received an optical switch 110 connected to an input (e.g., via a receiver arm), the optical switch 110 is configured as a splitter that outputs an optical signal received from the input to one of the first optical device 120a and the second optical device 120b (e.g., via a respective output arm). The optical combiner 140 is therefore configured as a combiner that receives outputs from either of the optical devices 120a-b (e.g., via respective input arms) and places the output onto a single shared transmission pathway (e.g., via a transmitter arm). To distinguish the various input/output arms of the optical switches 110 and combiners 140, a first splitter/combiner can be described as having a first primary, first secondary, first tertiary, first n-ary input arms or output arms, a second splitter/combiner can be described as having a second primary, second secondary, second tertiary, second n-ary input arms or output arms, and an nth splitter/combiner can be described as having an nth primary, nth secondary, nth n-ary input arms or output arms as necessary to identify which splitter or combiner a particular arm belongs to.

The optical devices 120, which can include various filters, multiplexers, demultiplexers, amplifiers, attenuators, lenses, taps (e.g., for probes to measure characteristics of the signal carrier thereon), microrings, optical resonators, splitters, optical mode multiplexers, 2×2 optical couplers, combined optical devices, etc., are, in one embodiment, the same type of device as one another, but are constructed with different tolerance ranges. As the optical devices 120 can include various passive devices, which are not powered or externally controlled or tuned after fabrication, the fabricated tolerance ranges of different optical devices 120 allow the operator or fabricator to select (via the optical switches 110 and combiners 140) various ranges to use during operations, without having to expend power to tune an active device. In some embodiments, the optical devices 120 include active devices, which are powered or externally controlled or tuned after fabrication, but which may not be controllable/tunable across the full fabrication range of the process being compensated for.

The tolerance ranges for the optical devices 120 indicate a fabrication range that a given optical device 120 compensates for in relation to a separate process of fabricating the photonic element. For example, when a first optical device 120*a* is described as having a tolerance range of 50-60 nm, the first optical device 120*a* is not (necessarily) constructed to have a thickness of 50-60 nm, but rather is constructed so that a later process, if applied with a thickness of 50-60 nm to the first optical device 120*a*, will result in the first optical device 120*a* passing operational tests.

As illustrated in FIG. 1, the first optical device 120*a* has a tolerance range of A-B, and the second optical device 120*b* has a tolerance range of C-D to indicate that the optical devices 120 have adjacent ranges. Either optical device 120 may offer the upper or lower portion of the range and the fabricator can select between the optical devices 120 to select the given optical device 120 that offers a tolerance range aligned with the result of the compensated-for process (e.g., satisfying an operational specification based on the outcome of the compensated-for process). The different ranges (e.g., A-B and C-D) discussed herein will be understood to include overlapping ranges (e.g., where A>C>B>D), adjacent non-overlapping ranges (e.g., where, A>B=C>D), and non-adjacent non-overlapping ranges (e.g., where A>B>C>D) in various embodiments. In each of the ranges discussed herein, A is a first upper range value and B is a first lower range value (i.e., A>B for the first range A-B), and C is a second upper range value and D is a second lower range value (i.e., C>D for the second range C-D). As will be appreciated, tolerances can allow for the overlap of the nominally non-overlapping ranges. For example, a first optical device 120*a* and a second optical device 120*b* can have respective ranges of 40-50 nm and 50-60 nm each ±5 nm, which could result in the first optical device 120*a* having a range of 35-55 nm and the second optical device 120*b* having a range of 45-65 nm.

In some embodiments, when the process that the differently-ranged optical devices 120 are compensating for is centered at a given value (e.g., a film deposition displaying a normal distribution for thickness over the toleranced range), the ranges and tolerances of the adjacent ranges are selected so that both of the optical devices 120 can nominally operate at the centered value(s) for the compensated-for process. For example, with a process centered at a thickness of 50 nm±5 nm (e.g., within 1σ of the centered value), the first optical device 120*a* may have a range of 40-52 nm±5 nm and the second optical device 120*b* may have a range of 48-60 nm±5 nm. Additionally or alternatively, the fabricator may select the ranges to (partially) overlap the optical devices 120 to so that if the compensated-for process is within the center of its range (e.g., within 1σ of the centered value) then either optical device 120 could be selected to allow an operator to switch between the optical devices 120 based on operational conditions. For example, if the first optical device 120*a* is originally selected for operation, and thermally degrades over time due to use, an operator may attempt to use the second optical device 120*b* when the first optical device 120*a* falls out of tolerance, thus potentially extending the operation lifetime of the photonic device.

Although the present disclosure primarily gives examples of the compensated-for process being performed during the construction of the selective photonic element itself (including the optical devices 120 thereof), in some embodiments, the differently ranged optical devices 120 can be additionally or alternative configured to compensate for processes and tolerances of separately fabricated devices connected to or mated with the selective photonic element. For example, a selective photonic element can be constructed with two (or more) differently ranged optical devices 120 that intentionally operate within different tolerances, but are provided to compensate for an external optical device (e.g., an optical transmitter). For example, a first optical device 120*a* can be selected when an optical transmitter operates within specification, while a second optical device 120*b* can be selected when the optical transmitter operates out of specification (e.g., bringing the optical signal back into specification for an optical receiver). Accordingly, the selective photonic element can be provided to compensate for the fabrication processes of an external device and relax the process margins thereof by selecting the optical device 120 matched to the operational profile of the separately fabricated external device (e.g., the optical transmitter).

Figure 2:
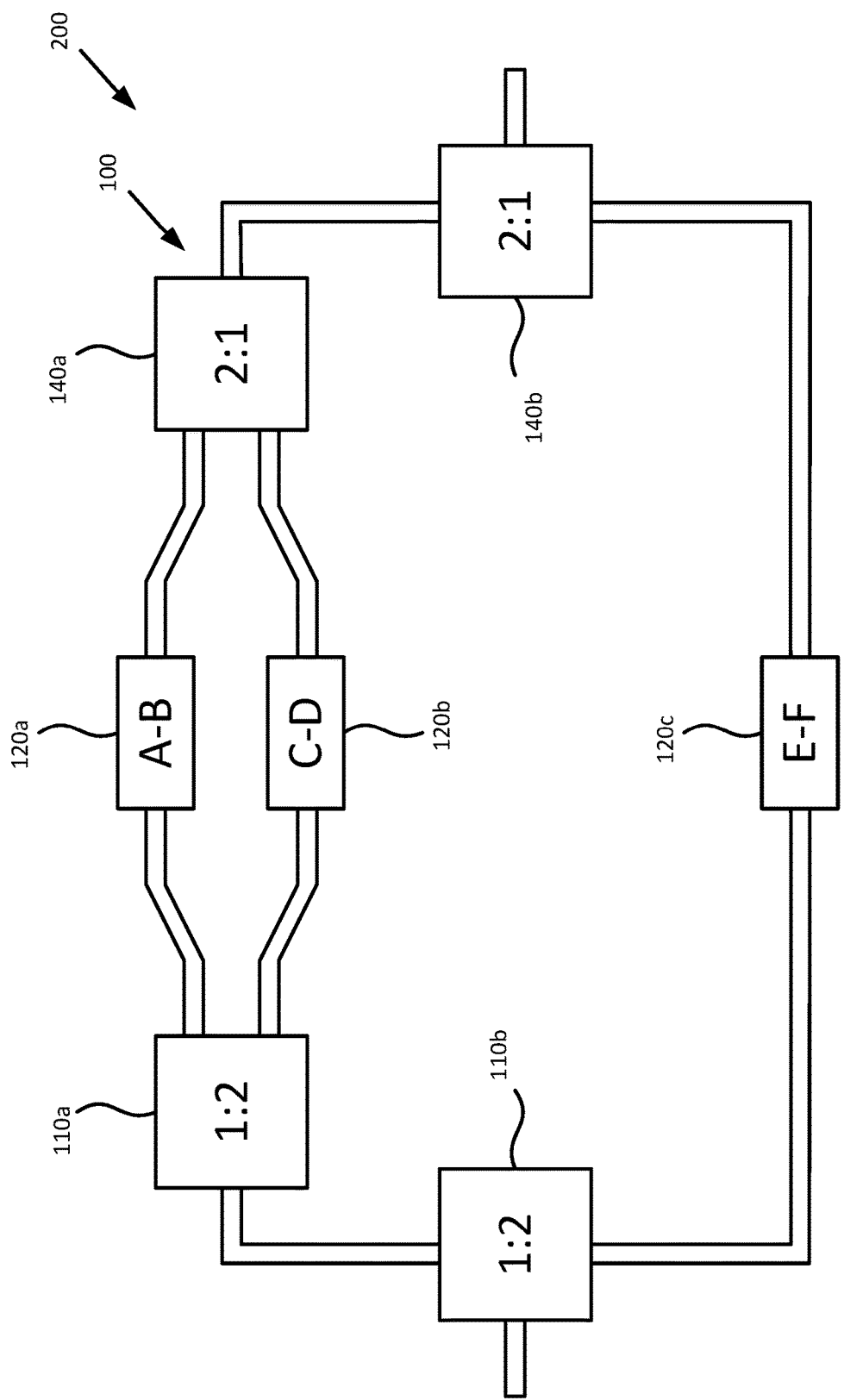
FIG. 2 illustrates a three-way architecture of a selective photonic element to improve the yield of photonic device fabrication, according to embodiments of the present disclosure.

FIG. 2 illustrates a three-way architecture 200 of a selective photonic element to improve the yield of photonic device fabrication, according to embodiments of the present disclosure. In various embodiments, a fabricator can construct three optical devices 120*a-c* to select between to compensate for the fabrication tolerances of the other fabrication process. The three-way architecture 200 includes the two-way architecture 100, as discussed in greater detail in regard to FIG. 1, as well as a second optical switch 110*b*, a second optical combiner 140*b*, and a third optical device 120*c*.

The third optical device 120*c* offers additional tolerance ranges from the first optical device 120*a* and the second optical device 120*b*. Although illustrated as having a range from E-F, it will be appreciated that the tolerance range of the third optical device 120*c* can be located to be below the tolerances ranges of the first and second optical devices 120*a-b* (e.g., A-B>C-D>E-F), above the tolerance ranges of the first and second optical devices 120*a-b* (e.g., E-F>A-B>C-D), or central to the tolerance ranges of the first and second optical devices 120*a-b* (e.g., A-B>E-F>C-D). In some embodiments, the third optical device 120*c*, which is handled by fewer optical switches 110 and combiners 140 than the first or second optical device 120*a-b* occupies a portion of the range of the compensated-for process that is seen most often in fabrication (e.g., the mean value and values seen within a given standard deviation from the mean).

When selecting either the first or second optical device 120*a-b* for use, the fabricator activates the second optical switch 110*b* to send optical signals to the first optical switch 110*a* and activates the second optical combiner 140*b* to receive optical signals from the first optical combiner 140*a*. The two-way architecture 100 performs individual selection of the first or second optical device 120*a-b* as is described in relation to FIG. 1.

When selecting the third optical device 120*c* for use, the fabricator activates the second optical switch 110*b* to send optical signals through the third optical device 120*c* and activates the second optical combiner 140*b* to receive optical signals from the third optical device 120c. In various embodiments, the fabricator leaves the first optical switch 110a and/combiner 140a deactivated or configures the first optical switches 110a and combiner 140a to extinguish any residual signals received from the second optical switch 110b.

Figure 3:
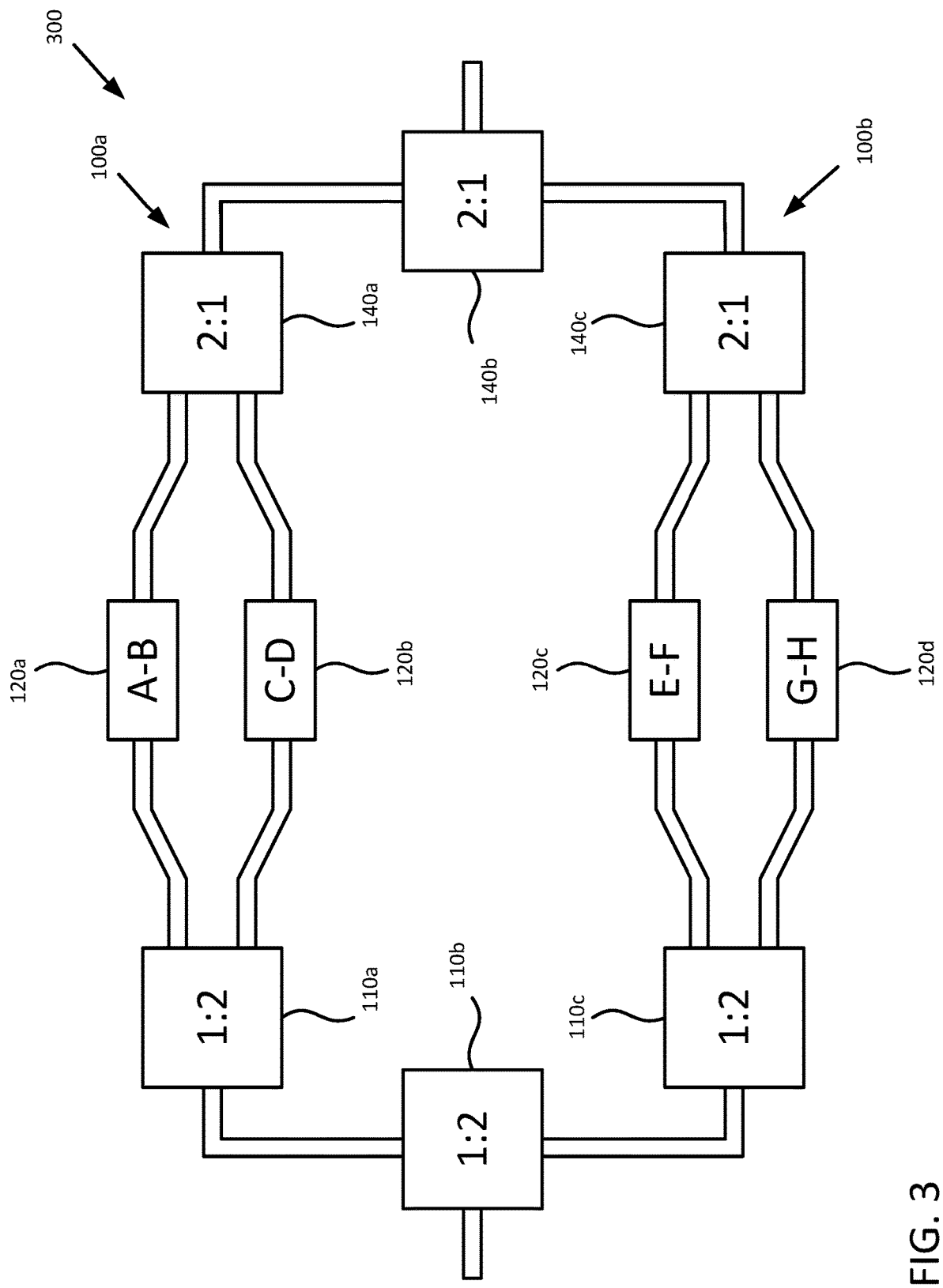
FIG. 3 illustrates a four-way architecture of a selective photonic element to improve the yield of photonic device fabrication, according to embodiments of the present disclosure.

FIG. 3 illustrates a four-way architecture 300 of a selective photonic element to improve the yield of photonic device fabrication, according to embodiments of the present disclosure. The four-way architecture 300 can be understood as a two-way architecture 100 that includes two-way architectures 110a-b as the optical devices 120. The fabricator can choose, via a second optical switch 110b and a second optical combiner 140b, whether to route a signal through the first two-way architecture 100a or the second two-way architecture 100b and select, via the selected two-way architecture 100 which optical device 120 to route the signal through.

When selecting either the first or second optical device 120a-b for use, the fabricator activates the second optical switch 110b to send optical signals to the first optical switch 110a and activates the second optical combiner 140b to receive optical signals from the first optical combiner 140a. The first two-way architecture 100a performs individual selection of the first or second optical device 120a-b as is described in relation to FIG. 1.

When selecting either the third or fourth optical device 120c-d for use, the fabricator activates the second optical switch 110b to send optical signals to the third optical switch 110c and activates the second optical combiner 140b to receive optical signals from the third optical combiner 140c. The second two-way architecture 100b performs individual selection of the third or fourth optical device 120c-d as is described in relation to FIG. 1.

By adding and removing hierarchies of optical switches 110 and combiners 140 and optical devices 120, one will be able to create n-way architectures to accommodate any number of optical devices 120. When creating an n-way architecture with an even number of optical devices 120, several levels of two-way architectures 100 may be layered, such as to produce a four-way architecture 300 illustrated in FIG. 3. When creating an n-way architectures with an uneven number of optical devices 120, several levels of two-way architectures 100 may be layered, and at least one layer includes a three-way architecture 200, such as is illustrated in FIG. 2.

Figure 4:
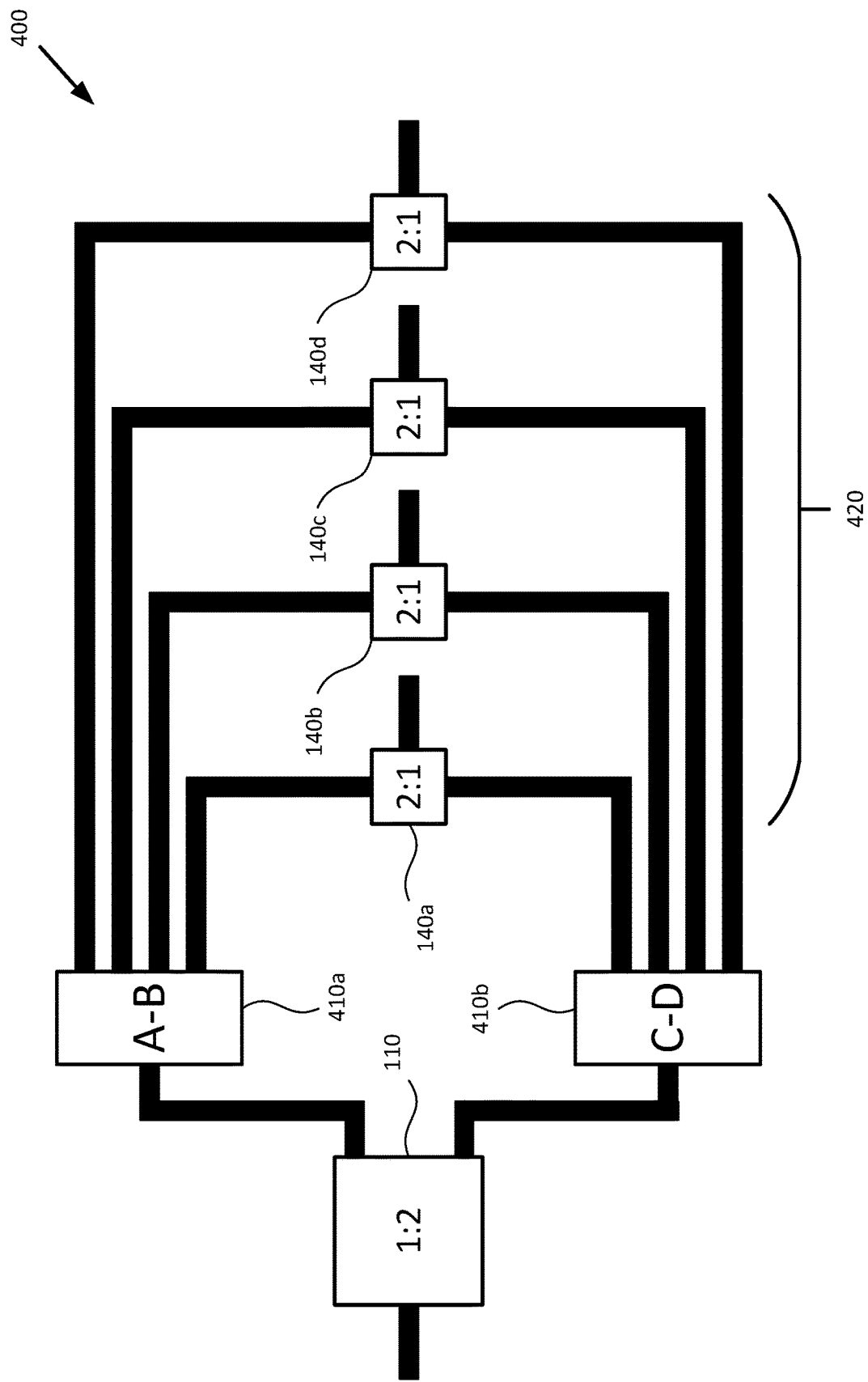
FIG. 4 illustrates a multiplexed two-way architecture of a selective photonic element to improve the yield of photonic device fabrication, according to embodiments of the present disclosure.

FIG. 4 illustrates a multiplexed two-way architecture 400 of a selective photonic element to improve the yield of photonic device fabrication, according to embodiments of the present disclosure. When the optical devices 120 are demultiplexers 410 (e.g., a first demultiplexer 410a and a second demultiplexer 410b) or multiplexers, the number of optical switches 110 and combiners 140 deployed by the fabricator on one side of the photonic element is greater than on the other side. For example, with a 4:1 demultiplexer 410, each demultiplexer 410 receives one input, and produces four outputs, each of which may carry data on a different wavelength and/or at a different time division, and thus should be interpreted separately. The first demultiplexer 410a is manufactured according a tolerance range of A-B while the second demultiplexer 410b is manufactured according to a tolerance range of C-D.

Accordingly, the first demultiplexer 410a and the second demultiplexer 410b are connected to an optical switch 110 on the input side (selectively receiving one input based on the operation of the optical switch 110) and output to each of the first through fourth optical combiners 140a-d (also referred to collectively as the optical combiners 420), albeit with different signals extracted from the input signal to each of the optical combiners 420. As will be appreciated, other ratios of multiplexers and demultiplexers 410 can be used as the optical devices 120 in the architectures discussed herein, with a corresponding number of optical combiners 140 making up the set of optical combiners 420. In various embodiments, each of the switches in the optical combiners 420 is configured or tuned for operation to receive signals of a different wavelength from the demultiplexers 410. Input arms for each of the optical combiners 420 are connected to the demultiplexers and outputs of the optical combiners 420 are connected to various downstream components (e.g., photodetectors, light sources, wavelength-matched amplifiers, phase shifters (including thermal phase shifters), wavelength shifters, separate transmission lines, additional optics, etc.).

By adding and removing hierarchies of optical switches 110 and combiners 140 and optical devices 120, similarly to as in FIGS. 1-3, one will be able to create multiplexed n-way architectures to accommodate any number of optical multiplexers or optical demultiplexers 410 (generally, multiplexers or demultiplexers 410).

Figure 5:
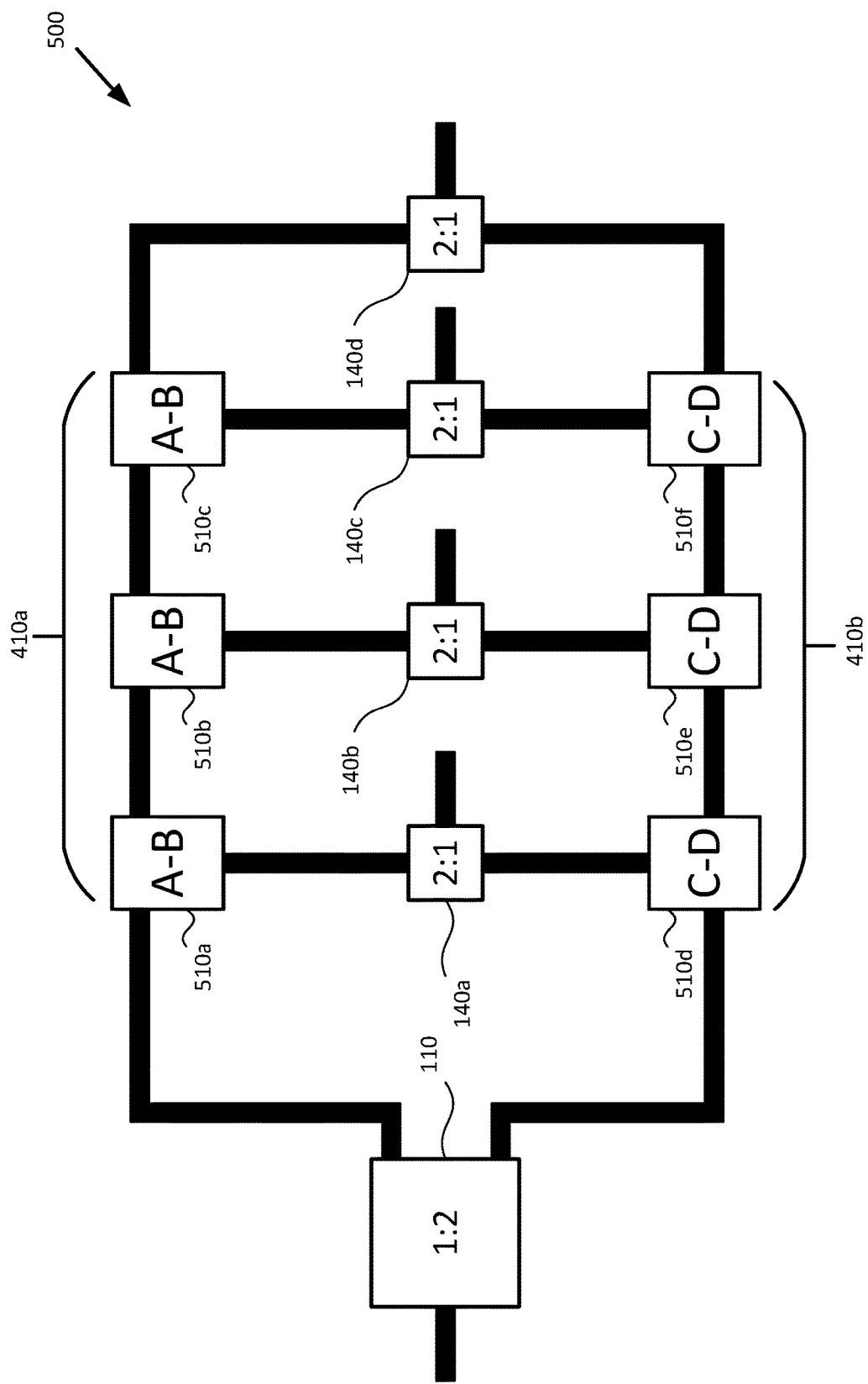
FIG. 5 illustrates a Bragg grating multiplexed two-way architecture of a selective photonic element to improve the yield of photonic device fabrication, according to embodiments of the present disclosure.

FIG. 5 illustrates a Bragg grating multiplexed two-way architecture 500 of a selective photonic element to improve the yield of photonic device fabrication, according to embodiments of the present disclosure. When the optical devices 120 are demultiplexers 410 (e.g., a first demultiplexer 410a and a second demultiplexer 410b) or multiplexers, which can include various Bragg gratings 510a-f (generally, Bragg grating 510) to split signal onto different arms, in various embodiments. The Bragg gratings 510a-c of the first demultiplexer 410a are manufactured according a tolerance range of A-B while the Bragg gratings 510c-f of the second demultiplexer 410b are manufactured according to a tolerance range of C-D.

The first demultiplexer 410a and the second demultiplexer 410b are connected to an optical switch 110 on the input side (selectively receiving one input based on the operation of the optical switch 110) and output to each of the first through fourth optical combiners 140a-d, albeit with different signals extracted from the input signal to each of the optical combiners 140a-d. As will be appreciated, other ratios of multiplexers and demultiplexers 410 can be used as the optical devices 120 in the architectures discussed herein, with a corresponding number of optical combiners 140 making up the set of optical combiners. In various embodiments, each of the switches in the optical combiners 140a-d is configured or tuned for operation to receive signals of a different wavelength from the demultiplexers 410. Outputs of the optical combiners 140a-d are connected to various downstream components (e.g., photodetectors, light sources, wavelength-matched amplifiers, phase shifters, wavelength shifters, separate transmission lines, additional optics, etc.).

In the Bragg grating demultiplexer two-way architecture 500 illustrated in FIG. 5, the first demultiplexer 410a includes a first Bragg grating 510a connected at an input to the optical switch 110, at a first output to a first optical combiner 140a, and a second output to an input of a second Bragg grating 510b. The second Bragg grating 510b is in turn connected at a first output to a second optical combiner 140b and at a second output to an input of a third Bragg grating 510c. The third Bragg grating 510c, being the final Bragg grating 510 in the present example, is connected at a first output to a third optical combiner 140c and at a second output to a fourth optical combiner 140d. Similarly, the second demultiplexer 410b includes three Bragg gratings 510*d-f* arranged in a chain formation to sequentially demultiplex various signals from a combined signal received from the optical switch 110 to the individual optical combiners 140*a-d*. As will be appreciated, a demultiplexer 410 including Bragg gratings 510 for use in demultiplexing n signals from a combined signal includes n−1 Bragg gratings 510 arranged in a chained formation.

By adding and removing hierarchies of optical switches 110 and combiners 140 and optical devices 120, similarly to as in FIGS. 1-3, one will be able to create multiplexed n-way architectures to accommodate any number of multiplexers or demultiplexers 410.

Figure 6:
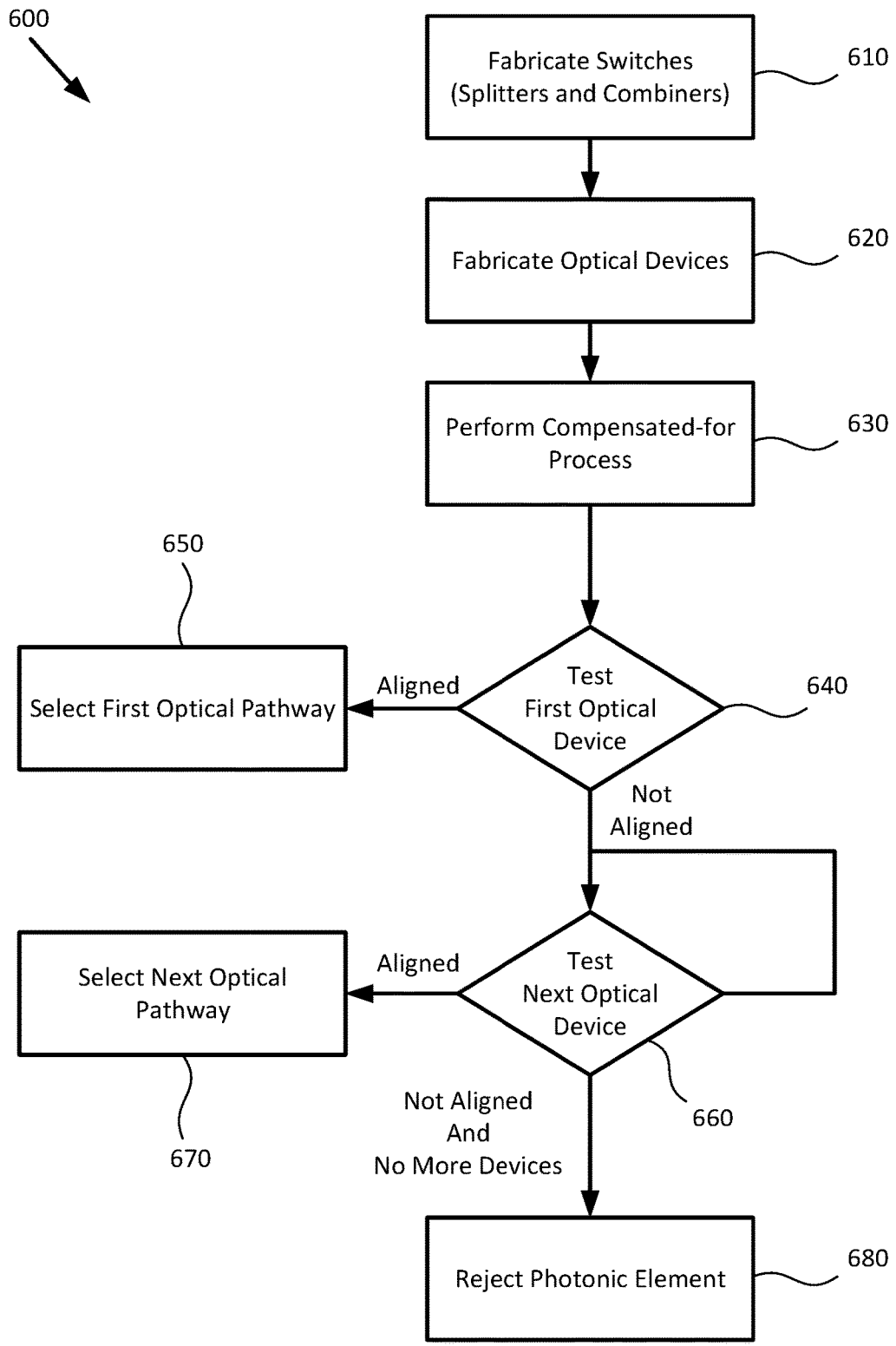
FIG. 6 is a is a flowchart of a method of fabrication and deployment for a selective photonic element, according to embodiments of the present disclosure.

FIG. 6 is a flowchart of a method 600 of fabrication and deployment for a selective photonic element, according to embodiments of the present disclosure. Method 600 begins with block 610, where the fabricator fabricates the various optical switching elements (e.g., optical splitters and optical combiners) to select a given pathway through a selectable photonic element for light to be carried through.

At block 620 the fabricator fabricates a plurality of optical devices 120 according to corresponding tolerance ranges (e.g., a first optical device 120*a* according to a first tolerance range, a second optical device 120*b* according to a second tolerance range, etc.). In various embodiments, the optical devices 120 can include one or more of: switches, filters, multiplexers, demultiplexers, amplifiers, attenuators, lenses, taps, microrings, optical resonators, etc. As will be appreciated blocks 610 and 620 may be performed with block 610 occurring before block 620, after block 620, or contemporaneously with block 620. The optical devices 120 are fabricated to be in communication with the various optical switching elements (e.g., splitter arms from the upstream optical switches 110, combiner arms of the downstream optical combiners 140), and the various switches 110 and combiners 140, when cascaded or arranged in a hierarchy are similarly fabricated to be in communication with one another.

At block 630, the fabricator performs the compensated-for process that the plurality of optical devices 120 fabricated per block 620 are constructed according to various tolerance ranges to select against. For example, the compensated-for process includes bonding a wafer or film of a material with a predefined thickness to the wafer in which the optical switches 110 and combiners 140 and optical devices 120 are fabricated, and/or etching a bonded, deposited, or grown layer on the wafer in which the optical switches 110 and combiners 140 and optical devices 120 are fabricated from a first thickness to a second (lesser) thickness to control for the different effects of the variable thickness of that material on the optical devices 120. In various embodiments, the compensated-for process is a part of the fabrication process of the optical switches 110 and combiners 140 and/or the optical devices 120, and method 600 may iterate through block 610-630 as several layers of material are deposited, etched, encapsulated, etc.

At block 640, the fabricator tests the first optical device 120*a*. In some embodiments, the fabricator adjusts the switches 110 and combiners 140 to direct a test signal through the first optical device 120*a* to determine whether the output signal indicates that the construction of first optical device 120*a* (e.g., according to the first tolerance range) is aligned with the result of the compensated-for process applied in block 630. In some embodiments, the fabricator measures the result of the compensated-for process applied in block 630 (e.g., a thickness of a material, a reflectivity of a surface, a conductivity of a material) and compares the result against the tolerance range of the first optical device 120*a* to determine whether the two are aligned.

When the first optical device 120*a* is aligned with the result of the compensated-for process, method 600 proceeds to block 650, where the fabricator selects the first optical pathway and sets the switches 110 and combiners 140 accordingly to direct optical signals into and out of the first optical device 120*a*.

When the first optical device 120*a* is not aligned with the result of the compensated-for process, method 600 proceeds to block 660, where the fabricator examines the next optical device 120 (e.g., a second optical device 120*b*). Similarly to block 640, the fabricator may test the given optical device 120 based on observing the quality of a test signal passed through the given optical device 120 or by matching the result of the compensated-for process against the tolerance range of the given optical device 120.

When the given optical device 120 is aligned with the result of the compensated-for process, method 600 proceeds to block 670, where the fabricator selects the given optical pathway associated with the given optical device 120 and sets the switches 110 and combiners 140 accordingly to direct optical signals into and out of the given optical device 120.

When the given optical device 120 (e.g., a second optical device 120*b*) is not aligned with the result of the compensated-for process, method 600 returns to block 660, where the fabricator examines the next optical device 120 (e.g., a third optical device 120*c*). When all of the optical devices 120 fabricated in the given photonic element have been tested, and none align with the result of the compensated-for process, method 600 proceeds to block 680, where the fabricator rejects the photonic element, which may be scrapped, recycled, or repurposed (e.g., for a different and/or more permissive operational specification).

In some embodiments, where the ranges of two or more optical devices 120 overlap, method 600 can include testing all of the optical devices 120 that have tolerance ranges that overlap and selecting the one optical device 120 that best satisfies an operational specification for the photonic element (e.g., the optical device 120 whose output is most-centered in the range specified by the operational specification). In some embodiments, when multiple optical devices 120 satisfy the operational specification, the fabricator can identify the other optical devices 120 that satisfy the operational specification (but were not selected as the "best" optical device 120) and indicate that such optical devices 120 may be used as backup or redundant components (e.g., when the originally selected "best" optical device 120 thermally degrades or is damaged).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

In view of the foregoing, the scope of the present disclosure is determined by the claims that follow.

We claim:

1. A photonic element, comprising:
   an optical switch including a first splitter arm and a second splitter arm;
   a first optical device in communication with the first splitter arm, wherein the first optical device satisfies a first fabrication tolerance range, wherein the first fabrication tolerance range includes a first upper range value and a first lower range value;
   a second optical device in communication with the second splitter arm, wherein the second optical device satisfies a second fabrication tolerance range, wherein the second fabrication tolerance range includes (i) a second upper range value lower than the first lower range value and (ii) a second lower range value, and wherein second fabrication tolerance range is different from the first fabrication tolerance range;
   a first optical combiner with a first combiner arm in communication with the first optical device and a second combiner arm in communication with the second optical device, wherein the first optical combiner is configured to receive optical signals of a first wavelength from the first optical device and the second optical device; and
   a second optical combiner, with a third combiner arm in communication with the first optical device and a fourth combiner arm in combination with the second optical device, wherein the second optical combiner is configured to receive optical signals of a second wavelength that is different from the first wavelength from the first optical device and the second optical device.

2. The photonic element of claim 1, wherein the first optical device and the second optical device are one of demultiplexers or multiplexers.

3. The photonic element of claim 1, wherein the optical switch, the first optical combiner, and the second optical combiner include thermal phase shifters.

4. The photonic element of claim 1, wherein the first fabrication tolerance range and the second fabrication tolerance range are set according to a fabrication process with a fabrication tolerance extending across the first fabrication tolerance range and the second fabrication tolerance range that is greater than an operational tolerance for the photonic element.

5. A photonic element, comprising:
   an optical switch including a first splitter arm and a second splitter arm;
   a first optical device including a first input arm, a first output arm, and a second output arm, wherein the first input arm is connected to the first splitter arm, and wherein the first optical device satisfies a first fabrication tolerance range, wherein the first fabrication tolerance range includes a first upper range value and a first lower range value;
   a second optical device including a second input arm in communication with the second splitter arm, a third output arm, and a fourth output arm, wherein the second input arm is connected to the second splitter arm, wherein the second optical device satisfies a second fabrication tolerance range, wherein the second fabrication tolerance range includes (i) a second upper range value lower than the first lower range value and (ii) a second lower range value, and wherein the second fabrication tolerance range is different from the first fabrication tolerance range;
   a third optical device including a third input arm, a fifth output arm, and a sixth output arm, wherein the third input arm is connected to the first output arm, and wherein the third optical device satisfies the first fabrication tolerance range;
   a fourth optical device including a fourth input arm, a seventh output arm, and an eighth output arm, wherein the fourth input arm is connected to the third output arm, and wherein the fourth optical device satisfies the second fabrication tolerance range;
   a first optical combiner connected to the second output arm and the fourth output arm;
   a second optical combiner connected to the sixth output arm and the eighth output arm; and
   a third optical combiner connected to the fifth output arm and the seventh output arm;
      wherein the first optical device and the second optical device are respectively configured to output first optical signals in a first wavelength range via the first output arm and the third output arm and output second optical signals in a second wavelength range via the second output arm and the fourth output arm; and
      wherein the third optical device and the fourth optical device are respectively configured to output third optical signals in a third wavelength range via the fifth output arm and the seventh output arm and output fourth optical signals in a fourth wavelength range via the sixth output arm and the eighth output arm.

6. The photonic element of claim 5, wherein the first optical device, the second optical device, the third optical device, and the fourth optical device are Bragg grating multiplexers or demultiplexers.

7. The photonic element of claim 5, wherein the optical switch, the first optical combiner, the second optical combiner, and the third optical combiner include thermal phase shifters.

8. The photonic element of claim 5, wherein the first fabrication tolerance range and the second fabrication tolerance range are set according to a fabrication process with a fabrication tolerance extending across the first fabrication tolerance range and the second fabrication tolerance range that is greater than an operational tolerance for the photonic element.

9. A method, comprising:
fabricating a first optical device in a first substrate to satisfy a first fabrication tolerance range and comprising a first upper range value and a first lower range value;
fabricating a second optical device in the first substrate to satisfy a second fabrication tolerance range comprising (i) a second upper range value lower than the first lower range value and (ii) a second lower range value;
fabricating a first optical switch in the first substrate connected to an input and configured to output an optical signal received from the input to one of the first optical device and the second optical device; and
fabricating a first optical combiner in the first substrate configured to combine outputs from the first optical device and the second optical device.

10. The method of claim 9, wherein the first fabrication tolerance range and the second fabrication tolerance range are set according to a fabrication process with a fabrication tolerance extending across the first fabrication tolerance range and the second fabrication tolerance range that is greater than an operational tolerance for a photonic element including the first optical device and the second optical device.

11. The method of claim 9, further comprising:
fabricating a third optical device in the first substrate to satisfy a third fabrication tolerance range, different than the first fabrication tolerance range and the second fabrication tolerance range;
fabricating a second optical switch in the first substrate connected to an input and configured to output the optical signal received from the input to one of the first optical switch and the third optical device, wherein the first optical switch is connected to the input via the second optical switch; and
fabricating a second optical combiner in the first substrate configured to combine outputs from the third optical device and the first optical combiner.

12. The method of claim 9, wherein the first optical device and the second optical device are one of multiplexers or demultiplexers, further comprising:
fabricating a second optical combiner in the first substrate configured to combine outputs from the first optical device and the second optical device;
wherein the first optical combiner is configured to receive optical signals of a first wavelength from the first optical device and the second optical device; and
wherein the second optical combiner is configured to receive optical signals of a second wavelength different from the first wavelength from the first optical device and the second optical device.

13. The method of claim 9, further comprising:
fabricating a second optical combiner in the first substrate configured to combine outputs from the first optical device and the second optical device;
fabricating a third optical combiner in the first substrate configured to combine outputs from the first optical device and the second optical device;
wherein the first optical device includes:
a first demultiplexer configured to receive the optical signal from the first optical switch and provide a first output of a first wavelength to the first optical combiner and a second output including a second wavelength and a third wavelength; and
a second demultiplexer configured to receive the second output from the first demultiplexer and provide a third output of the second wavelength to the second optical combiner and a fourth output including the third wavelength to the third optical combiner; and
wherein the second optical device includes:
a third demultiplexer configured to receive the optical signal from the first optical switch and provide a fifth output of the first wavelength to the first optical combiner and a sixth output including the second wavelength and the third wavelength; and
a fourth demultiplexer configured to receive the sixth output from the third demultiplexer and provide a seventh output of the second wavelength to the second optical combiner and an eighth output including the third wavelength to the third optical combiner.

14. The method of claim 9, wherein the first optical switch and the first optical combiner include thermal phase shifters.

* * * * *

UNITED STATES PATENT AND TRADEMARK OFFICE
CERTIFICATE OF CORRECTION

PATENT NO. : 12,035,082 B2
APPLICATION NO. : 18/056160
DATED : July 9, 2024
INVENTOR(S) : Tao Ling et al.

It is certified that error appears in the above-identified patent and that said Letters Patent is hereby corrected as shown below:

In the Specification

In Column 1, Line 34, delete "X %," and insert -- X%, --.

In Column 4, Line 37, delete "0-7" and insert -- 0-π --.

Signed and Sealed this
Third Day of September, 2024

Katherine Kelly Vidal
*Director of the United States Patent and Trademark Office*